US010041820B2

(12) United States Patent
Bauer et al.

(10) Patent No.: US 10,041,820 B2
(45) Date of Patent: Aug. 7, 2018

(54) INTEGRATION ELEMENT FOR SEATING MEASURING EQUIPMENT

(71) Applicant: Schaeffler Technologies AG & Co. KG, Herzogenaurach (DE)

(72) Inventors: Jorg Bauer, Erlangen (DE); Marco Frank, Hemhofen (DE); Armin Gerner, Pommersfelden (DE); Bernd Wittmann, Pommersfelden (DE); Christian Lehmann, Erlangen (DE); Matthias Sperber, Wachenroth (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 177 days.

(21) Appl. No.: 15/034,654

(22) PCT Filed: Aug. 12, 2014

(86) PCT No.: PCT/DE2014/200397
§ 371 (c)(1),
(2) Date: May 5, 2016

(87) PCT Pub. No.: WO2015/067249
PCT Pub. Date: May 14, 2015

(65) Prior Publication Data
US 2016/0320215 A1 Nov. 3, 2016

(30) Foreign Application Priority Data
Nov. 8, 2013 (DE) .................. 10 2013 018 700

(51) Int. Cl.
*G01D 11/24* (2006.01)
*G01D 5/14* (2006.01)
(Continued)

(52) U.S. Cl.
CPC .......... *G01D 11/245* (2013.01); *G01D 5/145* (2013.01); *G01M 17/007* (2013.01); *G01K 1/14* (2013.01); *G01L 1/125* (2013.01); *G01P 1/026* (2013.01)

(58) Field of Classification Search
CPC ........ G01D 11/245; G01D 5/145; G01K 1/14; G01L 1/125; G01P 1/026; G01M 17/007
See application file for complete search history.

(56) References Cited

U.S. PATENT DOCUMENTS

| 4,450,729 A | 5/1984 | Troeder et al. |
| 7,806,005 B2 | 10/2010 | Watanabe et al. |

(Continued)

FOREIGN PATENT DOCUMENTS

| CN | 202471036 | 10/2012 |
| DE | 138789 | 9/1943 |

(Continued)

*Primary Examiner* — Francis Gray
(74) *Attorney, Agent, or Firm* — Volpe and Koenig, P.C.

(57) ABSTRACT

An integration element including a shaft and a housing, wherein the housing includes a passage for the shaft and the shaft includes connecting elements on the shaft ends which are accessible from outside the housing, these elements providing a rotationally-fixed connection to connecting shafts. The housing has at least one connection for fastening to a connection structure and the shaft together with the housing delimits a measuring equipment space for receiving measuring equipment. The housing is formed by at least two housing parts detachably connected to each other, said housing parts being designed to be separated around the full extent of their circumference surrounding the shaft to allow access to the measuring equipment space. The housing has bearing seats for shaft bearings and these shaft bearings support the shaft in a rotatable manner with respect to the housing.

20 Claims, 6 Drawing Sheets

(51) Int. Cl.
*G01M 17/007* (2006.01)
*G01K 1/14* (2006.01)
*G01L 1/12* (2006.01)
*G01P 1/02* (2006.01)

(56) References Cited

U.S. PATENT DOCUMENTS

| | | | | |
|---|---|---|---|---|
| 2002/0164099 | A1* | 11/2002 | Eriksson | G01H 1/003 384/448 |
| 2003/0051549 | A1* | 3/2003 | Sherman | F16C 19/50 73/494 |
| 2008/0202226 | A1* | 8/2008 | Heim | F16C 19/52 73/114.81 |
| 2008/0264713 | A1* | 10/2008 | Deshmukh | B62D 5/0406 180/446 |
| 2009/0032328 | A1 | 2/2009 | Wong et al. | |
| 2012/0118081 | A1 | 5/2012 | Eicke et al. | |
| 2013/0134966 | A1 | 5/2013 | Hamaguchi et al. | |

FOREIGN PATENT DOCUMENTS

| | | |
|---|---|---|
| DE | 3112714 | 11/1982 |
| DE | 19638191 | 3/1998 |
| DE | 102008035989 | 2/2009 |
| DE | 102008056302 | 5/2010 |
| EP | 1398607 | 3/2004 |
| WO | 2008129558 | 10/2008 |

* cited by examiner

INTEGRATION ELEMENT FOR SEATING MEASURING EQUIPMENT

BACKGROUND

The invention relates to an integration element, having a shaft and a housing, and a drive train, for example, of an agricultural machine or a utility vehicle, provided with the integration element. An integration element in the context of the invention is intended to be understood to be a mechanical engineering component which is for transmitting torques and which is suitable for integration between machine components which are already provided.

In practice, it is known to rotatably support a rotating component, in particular a shaft, by means of at least one bearing, in particular by means of a roller or plain bearing, with respect to a bearing housing. In this instance, the shaft transmits a torque in many cases, wherein the requirement arises to detect the torque of the shaft.

The publication EP 1398607 relates to a sensor having a shaft, which is coupled in a rotationally secure manner to a magneto-resilient element. The torque flow is partially directed through the element. A housing is not provided in this instance. The sensor is not adequately protected. For mechanical engineering applications in operating conditions which are subjected to dirt, spray water, dust and slurry, referred to below as "rough" working conditions, for example, in agricultural machine technology or in utility vehicle technology, many previously known items of measuring equipment for detection of torque in accordance with the conventional prior art, for example, in accordance with the technical teaching of EP 1398607, do not appear to be sufficiently stable or durable. This lack of stability or the lack or durability is shown, for example, in that many previously known items of measuring equipment, after a high number of operating hours and/or under the influence of high loads, which must generally be anticipated in agricultural machine technology or in utility vehicle technology, do not withstand the active loads without limitation of function.

The current prior art discloses solutions which are suitable for detecting torques for heavy duty applications. The previously known items of measuring equipment for detection of torque are constructed as single or double-sided flange connections on a measuring shaft/shaft.

A common aspect of all these solutions for detecting measurement variables is that the contactless detection of the measurement variables on shafts is ensured in each case.

Furthermore, the structural integration of these solutions in the existing application, for example, in the chassis or the bodywork of an agricultural machine or a utility vehicle, or in predetermined connection constructions, is not simple to produce since no suitable connections are provided for this purpose.

SUMMARY

Based on the above-mentioned prior art, an object of the invention is to structurally improve the previous prior art. An integration element for receiving measuring equipment is intended to be developed.

According to the invention, this object is achieved by the integration element with one or more features of the invention.

The integration element according to the invention has a shaft and a housing, wherein the housing has a passage for the shaft. A passage is preferably intended to be understood to be two through-openings in the housing through which the shaft is inserted.

The invention further makes provision for the housing to have at least one connection for securing to a connection construction, wherein the shaft delimits together with the housing a measuring equipment space for receiving measuring equipment. The housing of the integration element according to the invention is formed by at least two housing components which are releasably connected to each other, wherein the housing components are constructed so as to be separable over the periphery thereof over the full extent around the shaft, in particular in a non-destructive manner, in order to enable access to the measuring equipment space.

This separability of the housing components affords the significant advantage that a replaceability of the measuring equipment in the measuring equipment space is provided. The term replaceability is intended to be understood to refer to the removal and the insertion of measuring equipment, so-called sensor components or sensors for short.

The replaceability affords in practice immense advantages with respect to conventional integration elements: this replaceability enables the user of the integration element according to the invention, for example, to introduce sensors into the integration element afterwards. The measuring equipment space can be quasi "retrofitted" with measuring equipment. Furthermore, sensors which are already used and which exhibit any damage or occurrences of failure in the field can be readily replaced with new sensors or measuring equipment with other properties or with improved properties.

The above-mentioned shaft further has, at the shaft ends thereof which are accessible from outside the housing, connection means for connection to connection shafts in a rotatably secure manner. Advantageously, these connection means may be formed by positive-locking carriers. For example, the shaft may be constructed as a spline shaft. An alternative embodiment makes provision for the use of feather keys as connection means for rotatably secure connection to connection shafts. However, it is also advantageously possible for alternative connection means to be used as long as these alternative means are suitable for producing a positive-locking and/or non-positive-locking connection between the shaft and connection shaft(s).

For the rotationally movable support of the above-mentioned shaft in the housing, the housing is provided with bearing seats which receive shaft bearings. The shaft of the integration element according to the invention is preferably constructed as a measurement shaft. In the measuring equipment space, measuring equipment for contactless detection of at least one physical measurement variable which is intended to be measured on the measurement shaft may be provided.

The term "bearing seats" is intended to be understood to refer, for example, to cylindrical recesses or holes which are suitable for receiving a shaft bearing in a positive-locking manner. Receiving a shaft bearing in the bearing seat with mechanical tension is also conceivable and in accordance with the invention. In this instance, the outer ring of the shaft bearing can be pressed into the bearing seat under tension, which affords the advantage that sliding of the bearing ring in the bearing seat can be prevented.

A housing component may have a bearing seat for a shaft bearing, respectively, wherein the shaft bearing comprises an inner ring and an outer ring and rolling or sliding members which are arranged between the inner ring and the outer ring, wherein the outer ring is supported in the bearing seat. This bearing seat for receiving the shaft bearing is advantageously incorporated in one of the housing components. The two housing components may further each have a securing flange, wherein at least one interface can advantageously be arranged between the securing flanges. The features and form of this interface are discussed below.

At least one of the housing components may have a radially outer securing flange for securing to a connection construction, which affords the advantage that, by means of simple screwing using conventional securing means, in particular by means of screws, the installation of the integration element is enabled. The complex production of weld connections can consequently be prevented.

The shaft bearings of the integration element according to the invention may advantageously have an inner ring and an outer ring, between which rolling or sliding members roll, for example, in raceways. The terms "inner ring" and "outer ring" are intended in this instance to be understood to refer to shaft bearing rings, or "bearing rings" for short. Bearing steel is advantageously provided as a material/raw material for a bearing ring. In an alternative embodiment, the bearings rings are produced from more corrosion-resistant metal material, for example, from semi-high-grade steel.

In order to secure a shaft bearing against axial displacement, the use of securing rings has been found to be advantageous: a securing ring can bring about the axial positioning of the housing of the integration element by this securing ring being introduced between the housing component and the outer ring of a shaft bearing. Other securing rings can bring about the axial retention of the integration element according to the invention by these additional securing rings being introduced in each case between an inner ring of a shaft bearing and the shaft. As a result of the functional cooperation of a plurality of securing rings, the shaft bearings can be secured against displacement in an axial direction.

The measuring equipment space can receive measuring equipment for measuring different physical measurement variables, preferably the torque, the speed and the rotation direction and/or the temperature. The measurement of the torque of the shaft may, for example, be carried out by means of the operating principles of magnetostriction. The term "magnetostriction" is intended to be understood in this instance to refer to a deformation of magnetic, in particular ferromagnetic, materials as a result of a magnetic field which is applied. The speed and rotation direction measurement in contrast may be carried out in a magnetic, alternatively inductive or optical manner. The measurement of the temperature can be carried out by a temperature sensor, for example, by means of a hot or cold conductor or by means of a thermoelement.

As a result of the provision of this space for measuring equipment for detecting measurement variables, the advantage is afforded that a derivation action is produced for the contactless measurement of different physical variables. As a result of the fact that this measuring equipment space is delimited by the housing of the integration element, measuring equipment which is located in this measuring equipment space is advantageously protected from influences outside the housing.

In another embodiment, the invention is developed in such a manner that the housing of the integration element according to the invention is formed by the incorporation of additional elements of the connection construction. The shaft then delimits together with the housing and together with the connection construction the above-mentioned measuring equipment space for receiving measuring equipment.

The simple replaceability of the measuring equipment affords a significant advantage of the integration element according to the invention. This replaceability can be achieved by the housing components being able to be separated from each other.

Another advantage is the advantage of production-optimized shaping of the integration element according to the invention. This advantage of production-optimized shaping may in particular also result from the use of structurally identical components, which is in the context of the present invention and which is described below.

As a result of the use of housing components which are structurally identical to an extremely great extent, simple assembly/disassembly of the integration element may become possible since, when housing components which are structurally identical to an extremely great extent are used, the number of mechanical coupling possibilities is reduced and consequently the possibilities of erroneous mechanical coupling of housing components are also reduced.

At least two housing components of the integration element according to the invention may advantageously be precisely structurally identical, which produces the above-mentioned advantage of production-optimized shaping. Housing components which are constructed in a precisely structurally identical manner can be produced, for example, sequentially in one and the same tool, for example, using only one casting mould. A second differently constructed casting mold can thereby be dispensed with, resulting in cost advantages.

A possible embodiment makes provision for two precisely structurally identical housing components which each have an integrally formed securing flange.

The housing components may advantageously each have a cylindrical cover, wherein the housing components are connected to each other at mutually facing end faces of the cylindrical cover.

Alternatively, between these housing components, there may be arranged a central portion of the housing which may be formed from a purely cylindrical structure. Furthermore, alternatively, at least one housing component is formed by a hollow-cylindrical structure and has a securing flange. The term "securing flange" is in this instance intended to be understood to be a structure which protrudes primarily in a radial manner with respect to the shaft axis and which is suitable for being secured to an adjacent connection construction, for example, being secured by screws which are arranged in an annular manner.

In another embodiment, the securing flange may be constructed as a separate component, which can be connected to the housing component.

The housing component or both housing components may comprise construction steel or bearing steel. In an advantageous embodiment, the housing component or the housing components is/are produced from lightweight construction material, for example, from alloys with aluminum portions or plastics material. The use of heavy-duty composite materials, for example, composite fiber materials, is conceivable and in accordance with the present invention.

In another advantageous embodiment of the housing, there are a plurality of housing components of a corrosion-resistant metal material, for example, of semi-high-grade steel. It is also conceivable within the context of the integration element according to the invention for a plurality of components of the integration element to be provided with a corrosion-inhibiting layer or with a corrosion-inhibiting paint. In the context of the corrosion-resistance, zinc coating of one or more housing components of the integration element is also in accordance with the invention. In another alternative embodiment of the housing, a plurality of housing components are coated with an extremely thin, galvanically applied layer. For example, such a coating is known under the trade name "Corrotect".

Significant weight advantages are afforded when a plurality of housing components of the integration element according to the invention are constructed in a lightweight construction. The term "lightweight construction" is intended to be understood to refer to the use of housing materials with a low specific mass, for example, with a lower specific mass than conventional steel.

Positioning means may be fitted to a continuous separation joint between the housing components in order to fix the two housing components to each other in a torsion-resistant manner. Such a positioning means may advantageously prevent the relative rotation of a housing component with respect to the releasably connected other housing component. Such a positioning means may, for example, be constructed as a clamping sleeve, wherein this clamping sleeve may comprise resilient material and can be introduced under the application of force into axially corresponding holes of both housing components. Before introduction into the holes, the clamping sleeve may be compressed transversely relative to the axis thereof by means of a pressing force, for example, with the hand. As soon as this clamping sleeve has been introduced into the hole, the pressing force can be taken away, whereby the clamping sleeve presses radially against the inner hole wall in order, as a result of the resilient property of the material thereof, to regain the original extent thereof. As a result of this pressing action, there is a non-positive-locking of the clamping sleeve with each housing component, in which the clamping sleeve is introduced. Since this positive-locking connection acts in both housing components, as a result of this force flow, a fixing of the two housing components to each other is brought about.

In an alternative embodiment, the positioning means may be constructed as a claw-like tooth arrangement which produces a torsion-resistance of the two housing components with respect to each other by means of claws, in a similar manner to the principle of a claw coupling. Two or more continuations then engage in each other at opposing ends of the housing components in a positive-locking manner and prevent as a result of this positive-locking connection a relative rotation of one housing component with respect to the releasably connected other housing component.

In a second alternative embodiment, the positioning means is constructed as an offset edge. The action as a rotation prevention means is also provided in that embodiment. In a third alternative embodiment, the positioning means may be constructed in several parts, preferably in accordance with the "tongue and groove" principle, wherein grooves are incorporated in the axial end of a housing component and tongues are incorporated in the opposing axial end of the second housing component. According to the tongue and groove principle, a positive-locking connection is produced between the first and second housing component, whereby a relative rotation of a housing component with respect to the opposing housing component is prevented.

In a fourth alternative embodiment, the positioning means is constructed in two parts and comprises a plug type element and a recess. The action as a rotation prevention means is also provided in that embodiment.

It has been found to be advantageous for the separation joint between the housing components to be sealed with respect to influences outside the housing, such as dust, dirt, foreign particles, or the like. Advantageously, the sealing of the separation joint is carried out by means of adhesive bonding or by introducing a sealing cord along the separation joint. When the housing components are released, although such adhesive bonding may be destroyed, the housing components can nonetheless be released at the separation joint in a non-destructive manner.

In order to provide further protection with respect to environmental influences, a shaft bearing can advantageously be sealed with respect to the housing environment by means of one or more seals. This is advantageous in order to enable the applicability of the invention in a rough working environment. As a result of the seal, it is possible to prevent dust, dirt or moisture from being able to be introduced into the inner side of the housing.

For example, these seals have been found to be advantageous primarily when produced from NBR or rubber materials. Selectively, a number of seals, optionally together with grease packets which protect against moisture can be fitted upstream of the shaft bearing. The seals may be in one or several pieces and may have one or more sealing lips. An advantageous application form of the seal is provided by the gap seal for sealing the bearing gap of the shaft bearing. A seal may further be constructed as a labyrinth seal or as a cassette seal. A construction of the seal as a metal seal is particularly advantageous since this, as a result of the metal material, has an increased service-life with respect to the rubber or NBR material and is therefore well-suited to rough working environments. Accordingly, so-called "Nilos Rings" can be used as seals.

In a very advantageous embodiment, a bearing ring of the shaft bearing already described is integrated directly in a housing component and the bearing seat is formed by this integrated bearing ring. The rolling or sliding members then roll directly against the housing component. However, the shaft bearing is then further formed by means of an inner ring which is secured to the shaft or can be secured to the shaft. More rapid assembly can thereby be carried out since the outer ring of the shaft bearing is omitted completely.

The housing of the integration element may advantageously have at least one interface for connection to a sensor which can be incorporated in the measuring equipment space for transmitting a physical measurement variable. This interface has already been mentioned above. It may advantageously be electrically coupled to an electrical evaluation unit outside the housing or to an electronic control device, in a wireless or wired manner.

Advantageously, the interface may be constructed as an electrical contacting which produces the electrical coupling of the evaluation unit or the control device to the above-mentioned measuring equipment which is provided in the measuring equipment space. The evaluation unit or the control device may be connected to the measuring equipment, for example, via bus lines, alternatively via discrete lines. The connection to the evaluation unit or to the control device can be carried out by means of a data bus. In a preferred embodiment, this interface is constructed as a, for example, multi-pole electrical plug type contact.

A preferred alternative embodiment is provided by the construction of the interface as an outgoing cable line. An outgoing cable line in the context of the invention is intended to be understood to be an electrical line which may be single or multi-strand and which can be guided directly out of the inner side of the housing of the integration element according to the invention, wherein the electrical plug type contact is then located not in the vicinity of the housing, but instead only at the end of this electrical line.

As a result of the above-described outgoing cable line, other advantages are afforded: on the one hand, the electrical plug type contact may be provided remote from the housing, ideally in a more protected working environment. This results in the electrical plug type contact being able to be constructed in a more favorable IP protection class than in the environment close to the housing, which would require a high IP protection class, for example, IP65 or the like. As a result of the lower protection class, the electrical plug type contact can be constructed in a more space-saving manner. On the other hand, electrical plug type contacts in a lower IP protection class are often more cost-effective.

The integration element according to the invention may be incorporated in a drive train, for example, in a drive train of an agricultural machine or utility vehicle, wherein the shaft of the integration element can be coupled to a shaft of the drive train in a rotationally secure manner. A shaft end of the drive train can be coupled to each shaft end of the integration element according to the invention.

BRIEF DESCRIPTION OF THE DRAWINGS

Embodiments of the invention are described in greater detail below with reference to the Figures, in which.

DETAILED DESCRIPTION OF THE PREFERRED EMBODIMENTS

Figure 1:
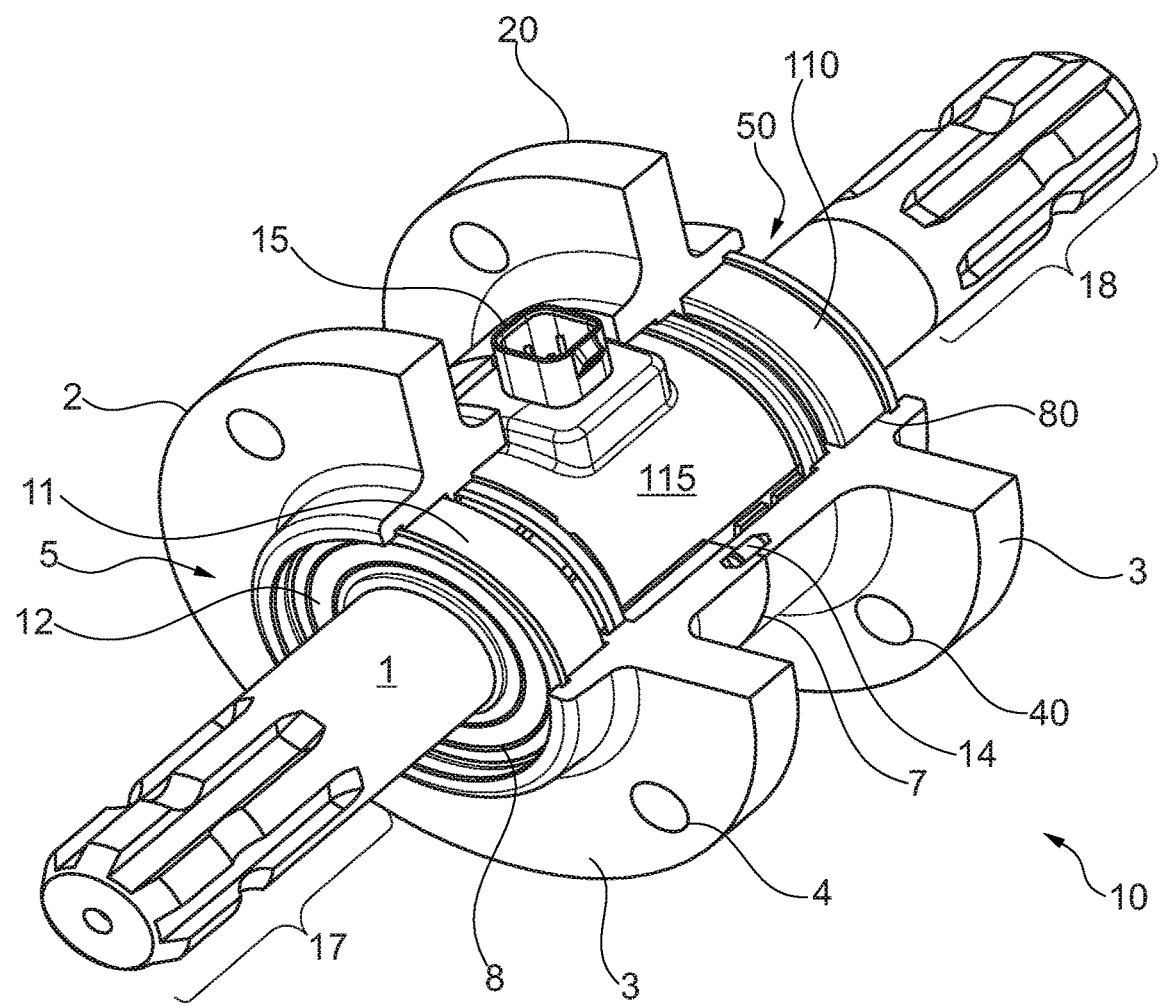
FIG. 1 is a sectioned perspective view of an integration element according to the invention.
Figure 2:
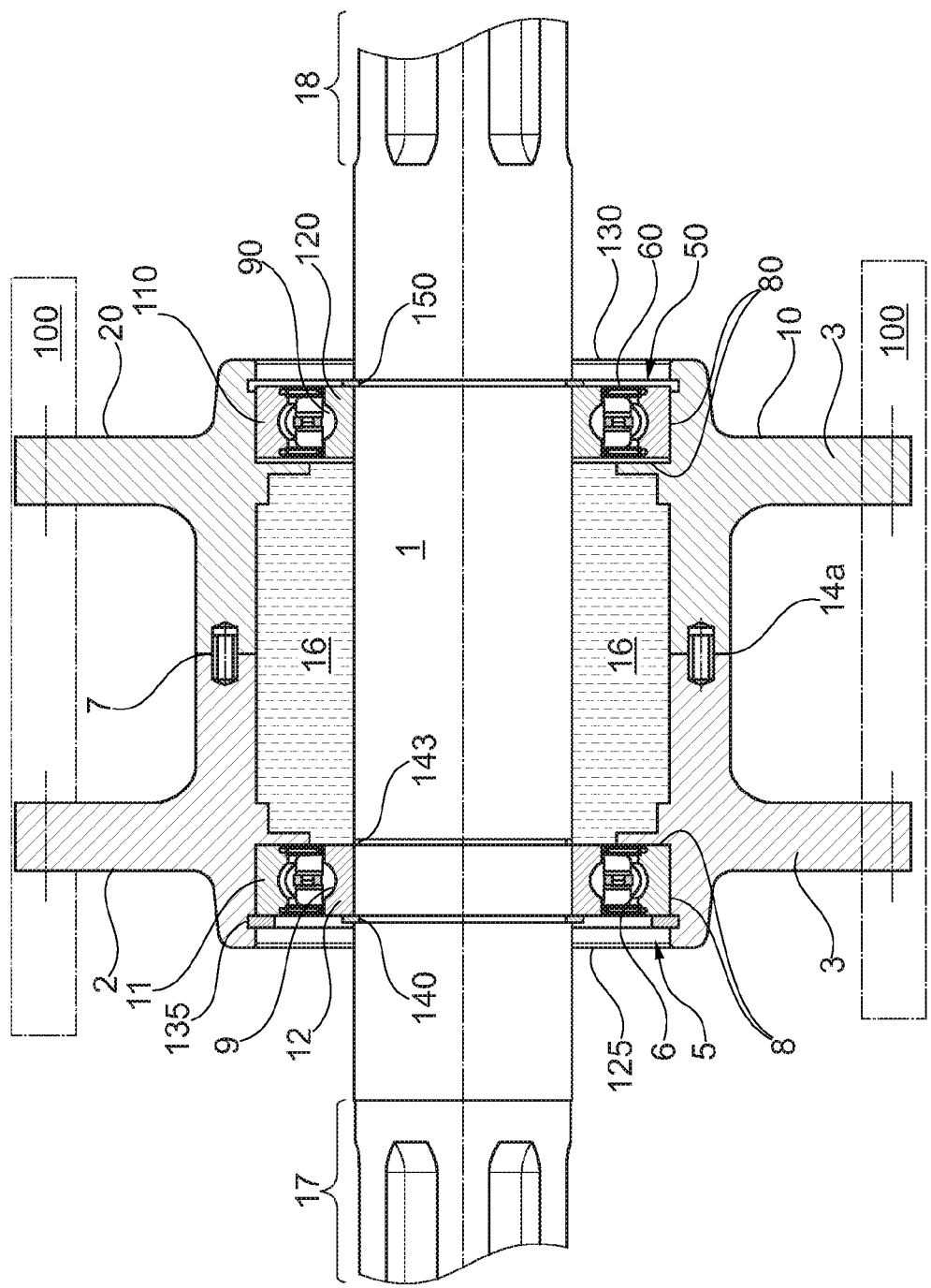
FIG. 2 is a full cross-section of the integration element from FIG. 1, but with indicated connection construction.

FIG. 1 and FIG. 2 are sectioned perspective views of an integration element according to the invention according to a first embodiment, respectively, wherein in FIG. 1 the connection construction 100 is not illustrated. Two housing components 2, 20 of a housing 10 of one and the same integration element according to the invention are illustrated, which components are structurally identical to an extremely great extent.

The two housing components 2, 20 accommodate a measuring equipment space 16. The measuring equipment space 16 is taken up completely in FIG. 1 by a sensor housing 115. An interface 15 enables access from the outer side of the housing to the measuring equipment, which is located (not visible) inside the sensor housing 115. The housing components 2, 20 are joined to each other in the central region thereof, at a separation joint 7.

The housing components 2, 20 are produced from lightweight material, in the embodiment discussed in accordance with FIG. 1 and FIG. 2 from an aluminum-containing alloy. There extends through the housing 10 the shaft 1 which is supported inside the housing. FIG. 1 further indicates a piece of measuring equipment which is fitted between the housing components 2, 20.

The housing 10 in the embodiments according to FIG. 1 and FIG. 2 has integrated shaft bearings 5, 50 which are constructed as deep-groove ball bearings. These deep-groove ball bearings are each formed from an inner ring 12, 120 and an outer ring 11, 110. Balls 9, 90 roll between these rings 11, 12, 110, 120. The housing 10 is, with the cylindrical, covering portions thereof, comprising the two housing components 2, 20, arranged coaxially around the shaft 1. This shaft 1 is produced from steel and acts as a measuring shaft, with which physical measurement variables are detected.

The detection of these physical measurement variables is carried out by the measuring equipment inside the sensor housing 115. This measuring equipment serves primarily to measure the torque, the speed and rotation direction and the temperature of the shaft 1. The measuring equipment space 16, illustrated in FIG. 2 as dashed surfaces above and below the shaft 1, is surrounded by the housing 10 of the integration element. Axially at both sides of this measuring equipment space 16 are the bearing seats 8, 80 of the shaft bearings 5, 50. The measuring equipment space 16 forms in this embodiment an annular chamber which surrounds the shaft 1. The housing components 2, 20 have securing flanges 3. These are in the embodiment according to FIG. 2 constructed in a structurally identical manner as four-hole flanges and enable the integration element to be secured to an adjacent connection construction 100. Only two drill holes 4, 40 can be seen in each case. The securing of the integration element to an adjacent connection construction 100 is carried out by means of screws which are not illustrated. These screws extend through the holes 4, 40 of the flange 3 and are screwed to the connection construction 100.

From FIG. 1 and FIG. 2 it can further be easily seen that the shaft 1 can be connected at both axial sides of the housing 10 to adjacent shaft portions. To this end, connection means 17, 18 are provided at the shaft ends. These connection means 17, 18 are incorporated as spline shaft profiles in the ends of the shaft 1. The shaft 1 may be constructed as a solid shaft or hollow shaft. The above-mentioned connection means 17, 18 serve to fix the shaft 1 to a connection shaft in a rotationally secure manner.

The left-hand shaft bearing 5 is constructed as so-called fixed bearing. The right-hand shaft bearing 50 is constructed as a so-called floating bearing. This can be seen from the position of the securing ring 150.

Additional securing rings are illustrated in FIG. 2. A securing ring 135 brings about the axial positioning of the housing 10 of the integration element. This securing ring 135 is introduced between the housing component 2 and the outer ring 11. Additional securing rings 140, 150 serve to axially retain the integration element according to the invention in that both securing rings 140, 150 are introduced between the inner ring 12, 120 and shaft 1. As a result of the functional cooperation of all the securing rings 135, 140, 150, both shaft bearings are secured against displacement in an axial direction. Another securing ring 143 is also introduced between the shaft 1 and the inner ring 12 of the first shaft bearing 5. This securing ring 143 secures together with the securing ring 140 the inner ring 12 against axial displacement. The first shaft bearing 5 is thereby secured as a fixed bearing.

As can clearly be seen in FIG. 1 and in FIG. 2, there are further provided clamping sleeves 14a which enable as positioning means 14 a correct positioning of the housing components relative to each other. As a result of these clamping sleeves 14a, two effects are achieved. Firstly, the two housing halves 2, 20 are joined to each other in a non-positive-locking manner since the clamping sleeves can be introduced into the drilled holes provided for them only with the application of force, whereby a fixing of the housing halves 2, 20 to each other is carried out. Secondly, the first housing half 2 is secured against relative rotation with the second housing half 20 about the shaft axis.

Figure 3:
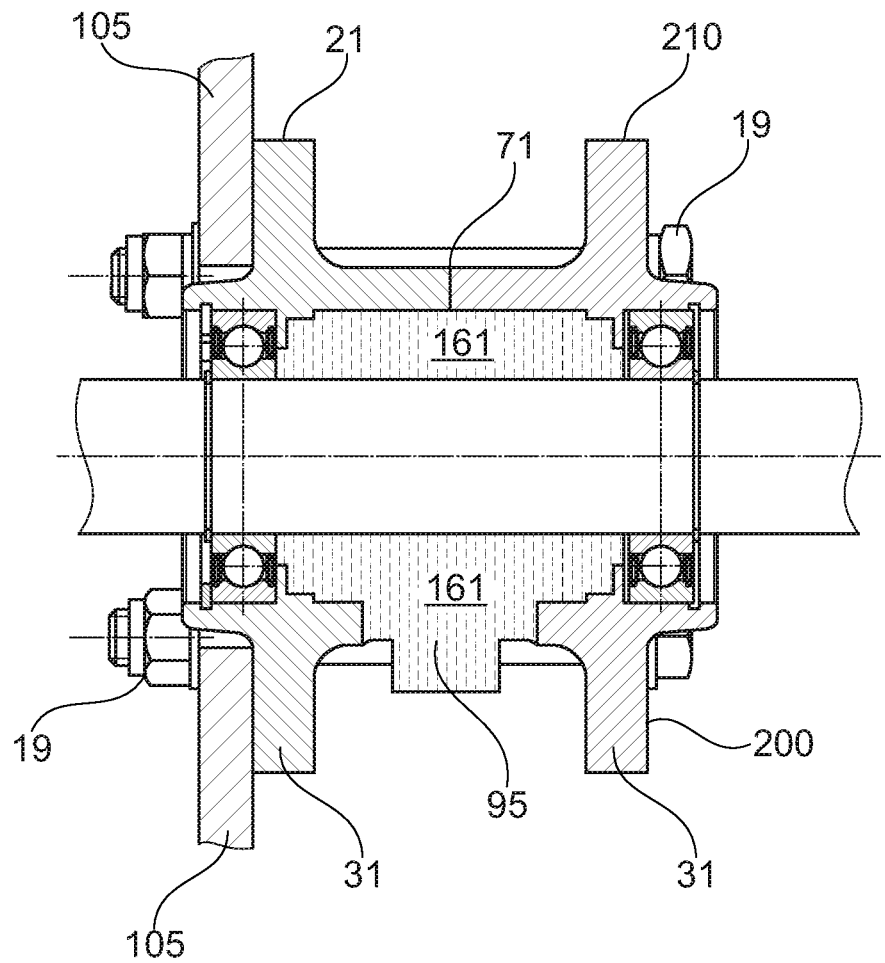
FIG. 3 is a sectioned illustration of a variation of the embodiment according to FIG. 1 as in FIG. 2.
Figure 4:
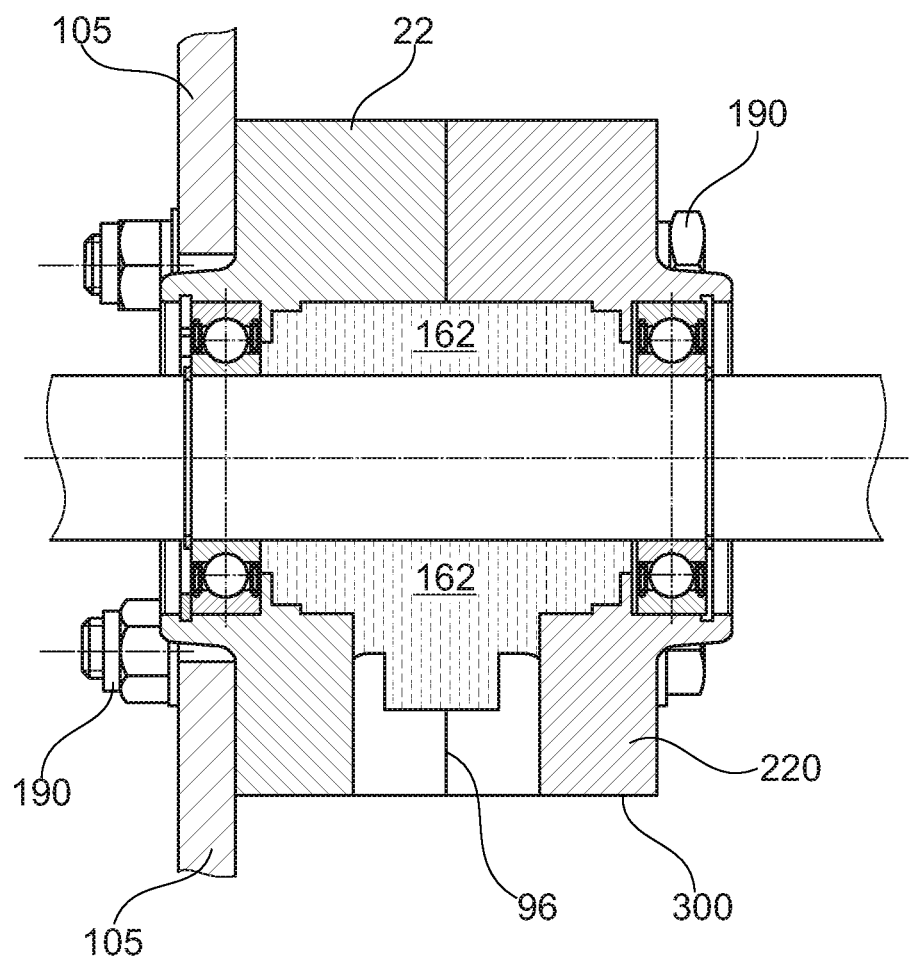
FIG. 4 is a sectioned illustration of another variation of the embodiment according to FIG. 1 as in FIG. 2.
Figure 5:
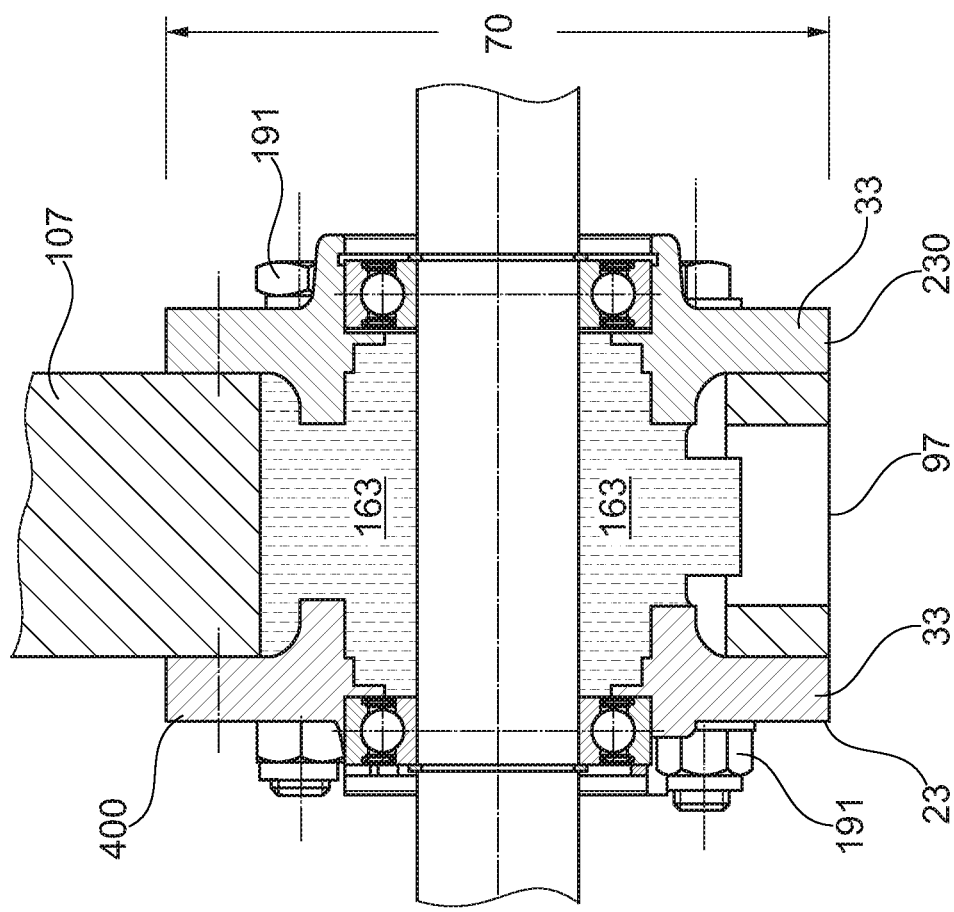
FIG. 5 is a sectioned illustration of a second variation of the embodiment according to FIG. 1 as in FIG. 2.

The embodiments according to FIG. 3 and FIG. 5 show exemplary variations of the securing flanges of the housing components of the embodiment according to FIG. 2. In the embodiments according to FIG. 3, FIG. 4 and FIG. 5, the connection means 17, 18 of the shaft 1 are constructed as described in the embodiment of FIG. 1 and have not been illustrated again for reasons of simplicity.

FIG. 3 shows two structurally identical housing components 21, 210, including the securing flanges 31. The securing flanges 31 are formed integrally with the housing components 21, 210. They enable the securing of the integration element to an adjacent connection construction 105 in each case by means of securing means 19. These securing means 19 are constructed as screws with associated screw nuts. The connection construction 105 is illustrated in a state broken-away at both sides "above and below" the integration element. This connection construction 105 according to this embodiment of FIG. 3 is a machine component of the chassis. The securing of the securing means 19 to the integration element is carried out at connections (not illustrated) provided for this purpose. By inserting the screws 19 into the connections (not illustrated) and connecting the screw ends to the connection construction 105, the securing is produced. The housing components 21, 210 are axially delimited under load by the securing means 19 and retained. The access to the inner housing side from the outer housing side is carried out via the interface 95 which is illustrated as an opening in the housing 200.

The embodiment according to FIG. 4 also shows a variation, but without the securing flanges. Instead, the securing means are in this instance also constructed as screws 190 with nuts, inserted into the solid material of the structurally identical housing components 22, 220. The screw members of the screws 190 penetrate these housing components 22, 220. These housing components 22, 220 are axially delimited by the screws 190 and retained. It is not illustrated that more than two screws 190 are used. The screws 190 are arranged in a circular ring-like manner around the shaft in such a manner that the housing 300 is connected to the connection construction 105 by means of a screw ring. The access to the inner side of the housing 300 from the outer side of the housing is also carried out, as in FIG. 3, via an interface 96. In FIG. 4, a left-sided securing of the integration element according to the invention to the connection construction 105 is shown. A right-sided application of the integration element is not provided, that is to say, the integration element is free at the right side in this construction variant.

Of all the construction variants, only the embodiment in FIG. 5 shows the central securing of the housing components 23, 230 to a connection construction which is constructed as a central console 107. This central console 107 is clamped by means of separate securing means (not illustrated) between the structurally identical securing flanges 33 in a positive and/or non-positive-locking manner. Although the housing components 23, 230 have the same flange diameters 70, they are not structurally identical. In this embodiment, the measurement equipment space 163 is delimited not only by the housing components 23, 230 alone, but also by the central console 107.

Figure 6A:
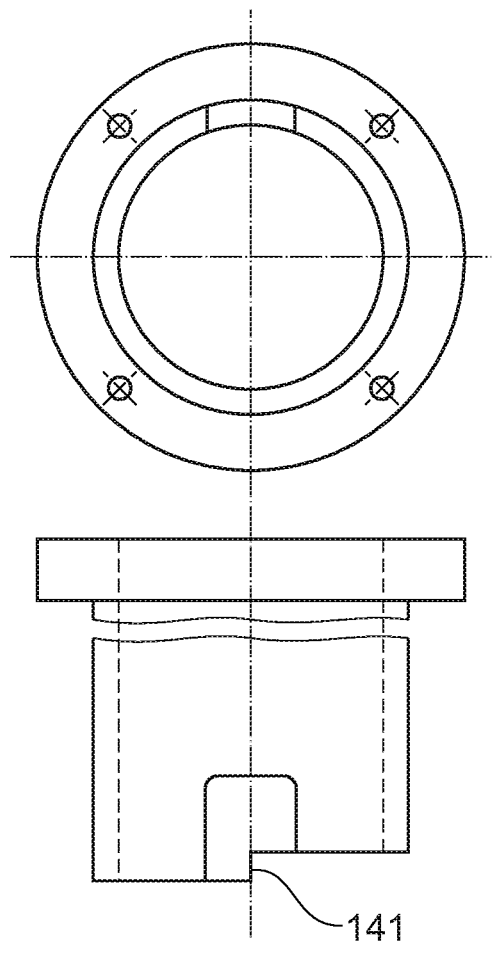
FIGS. 6A and 6B shows by way of example two positioning means which are each fitted to a housing component of an integration element according to the invention. Two exemplary housing components are illustrated as a plan view and a side view, respectively.
Figure 6B:
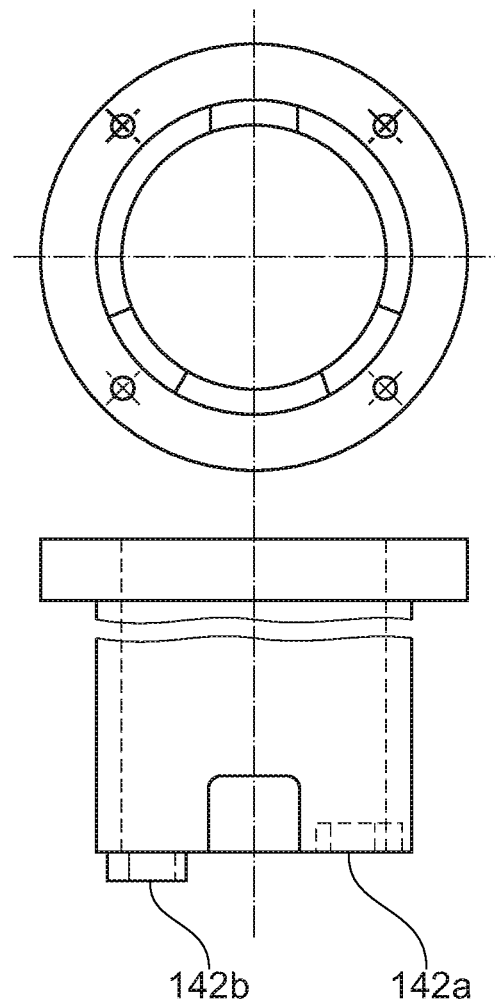

In addition to the construction variants, FIG. 6A and FIG. 6B show by way of example the use of different types of positioning means 141, 142a, 142b, wherein the positioning means are directly incorporated in the housing component. In the alternative embodiment according to FIG. 6A, the positioning means 141 is constructed as an offset edge which provides rotation prevention when two structurally identical housing components are joined to each other in a releasable manner. In contrast, in the alternative embodiment according to FIG. 6B, the positioning means 142 is constructed in two parts from a recess 142a and a plug type element 142b. The recess 142a is incorporated in the axial end of a housing component and can be connected to the plug type element 142b of the opposing housing component in a positive-locking manner. With the connection, there is produced a positive-locking connection between the first and the second housing component, whereby a relative rotation of a housing component in relation to the opposing housing component is prevented.

LIST OF REFERENCE NUMERALS

1 Shaft
2 Housing component
3 Securing flange
4 Connection
5 Shaft bearing
6 Seal
7 Separation joint
8 Bearing seat
9 Rolling or sliding member
10 Housing
11 Outer ring
12 Inner ring
14 Positioning means
14a Clamping sleeve
15 Interface
16 Measuring equipment space
17 Connection means
18 Connection means
19 Securing means
20 Housing component
21 Housing component
22 Housing component
23 Housing component
31 Securing flange
33 Securing flange
40 Connection
50 Shaft bearing
60 Seal
70 Flange diameter
71 Separation joint
80 Bearing seat
90 Rolling or sliding member
95 Interface
96 Interface
97 Interface
100 Connection construction
105 Connection construction
107 Central console
110 Outer ring
115 Sensor housing
120 Inner ring
125 Passage 130 Through-opening
135 Securing ring
140 Securing ring
141 Positioning means
142a Recess
142b Plug type element
143 Securing ring
150 Securing ring
161 Measuring equipment space
162 Measuring equipment space
163 Measuring equipment space
190 Securing means
191 Securing means
200 Housing
210 Housing component
220 Housing component
230 Housing component
300 Housing
400 Housing

The invention claimed is:

1. An integration element, comprising:
a shaft and a housing,
the housing has a passage for the shaft,
the shaft has shaft ends that are accessible from outside the housing, and the shaft ends have connection elements for connection to connection shafts in a rotationally secure manner,
at least one connection on the housing for securing to a connection construction,
the shaft delimits together with the housing a measuring equipment space for receiving measuring equipment,
the housing is formed by at least two housing components which are releasably connected to each other,
the housing components are constructed so as to be separable over a periphery thereof over a full extent around the shaft in order to enable access to the measuring equipment space,
bearing seats in the housing and shaft bearings located in the bearing seats, and,
the shaft bearings rotatably movably support the shaft with respect to the housing,
wherein the housing components each have one of the bearing seats for one of the shaft bearings, and each of the shaft bearings comprises an inner ring and an outer ring and rolling or sliding members which are arranged between the inner ring and the outer ring, and the outer ring is supported in the bearing seat.

2. The integration element as claimed in claim 1, wherein the shaft is formed by a measurement shaft, and measuring equipment is provided in the measuring equipment space for contactless detection of at least one physical measurement variable to be measured on the measurement shaft.

3. The integration element as claimed in claim 1, wherein the at least two housing components are structurally identical.

4. The integration element as claimed in claim 1, wherein the shaft bearing is sealed with respect to the housing environment by a seal.

5. The integration element as claimed in claim 1, wherein the housing has at least one interface for connection to a sensor which is integrated in the measuring equipment space in order to transmit a physical measurement variable.

6. An integration element, comprising:
a shaft and a housing,
the housing has a passage for the shaft,
the shaft has shaft ends that are accessible from outside the housing, and the shaft ends have connection elements for connection to connection shafts in a rotationally secure manner,
at least one connection on the housing for securing to a connection construction,
the shaft delimits together with the housing a measuring equipment space for receiving measuring equipment,
the housing is formed by at least two housing components which are releasably connected to each other,
the housing components are constructed so as to be separable over a periphery thereof over a full extent around the shaft in order to enable access to the measuring equipment space,
bearing seats in the housing and shaft bearings located in the bearing seats, and,
the shaft bearings rotatably movably support the shaft with respect to the housing,
wherein the housing components each have a cylindrical cover, and the housing components are connected to each other at mutually facing end faces of the cylindrical covers.

7. The integration element as claimed in claim 1, wherein at least one of the housing components has a radially outer securing flange for securing to the connection construction and the bearing seat in order to receive the shaft bearing.

8. The integration element as claimed in claim 5, wherein the two housing components each have a securing flange and the at least one interface is arranged between the securing flanges.

9. The integration element as claimed in claim 1, wherein the shaft together with the housing and together with the connection construction delimits the measuring equipment space for receiving measuring equipment.

10. The integration element as claimed in claim 1, wherein at least one of the shaft bearings is secured by securing rings against axial displacement.

11. An integration element, comprising:
a shaft and a housing,
the housing has a passage for the shaft,
the shaft has shaft ends that are accessible from outside the housing, and the shaft ends have connection elements for connection to connection shafts in a rotationally secure manner,
at least one connection on the housing for securing to a connection construction,
the shaft delimits together with the housing a measuring equipment space for receiving measuring equipment,
the housing is formed by at least two housing components which are releasably connected to each other,
the housing components are constructed so as to be separable over a periphery thereof over a full extent around the shaft in order to enable access to the measuring equipment space,
bearing seats in the housing and shaft bearings located in the bearing seats, and,
the shaft bearings rotatably movably support the shaft with respect to the housing,
wherein a positioning element prevents the relative rotation of a housing component in relation to the releasably connected other housing component.

12. A drive train having the integration element as claimed in claim 1, wherein the shaft is coupled to a shaft of the drive train in a rotationally secure manner.

13. The integration element as claimed in claim 6, wherein the shaft is formed by a measurement shaft, and measuring equipment is provided in the measuring equipment space for contactless detection of at least one physical measurement variable to be measured on the measurement shaft.

14. The integration element as claimed in claim 11, wherein the shaft is formed by a measurement shaft, and measuring equipment is provided in the measuring equipment space for contactless detection of at least one physical measurement variable to be measured on the measurement shaft.

15. The integration element as claimed in claim 6, wherein the at least two housing components are structurally identical.

16. The integration element as claimed in claim 11, wherein at least one of the shaft bearings is secured by securing rings against axial displacement.

17. The integration element as claimed in claim 6, wherein at least one of the housing components has a radially outer securing flange for securing to the connection construction and the bearing seat in order to receive the shaft bearing.

18. The integration element as claimed in claim 6, wherein the housing has at least one interface for connection to a sensor which is integrated in the measuring equipment space in order to transmit a physical measurement variable.

19. The integration element as claimed in claim 11, wherein the housing has at least one interface for connection to a sensor which is integrated in the measuring equipment space in order to transmit a physical measurement variable.

20. The integration element as claimed in claim 11, wherein the shaft together with the housing and together with the connection construction delimits the measuring equipment space for receiving measuring equipment.

\* \* \* \* \*